US005588396A

United States Patent [19]
Yoshida

[11] Patent Number: 5,588,396
[45] Date of Patent: Dec. 31, 1996

[54] SPAWNING CASE FOR USE IN AN AQUARIUM

[75] Inventor: Nobuyuki Yoshida, Tokyo, Japan

[73] Assignee: Nihon Doubutsu Yakuhin Kabushikigaisva, Tokyo, Japan

[21] Appl. No.: 426,714

[22] Filed: Apr. 21, 1995

[30] Foreign Application Priority Data

May 17, 1994 [JP] Japan ................. 6-006539 U

[51] Int. Cl.[6] .................................. A01K 63/00
[52] U.S. Cl. ............................ 119/252; 119/261
[58] Field of Search .................. 119/248, 252, 119/259, 260, 261, 262, 263, 251

[56] References Cited

U.S. PATENT DOCUMENTS

| 3,140,691 | 7/1964 | Stark | 119/252 |
| 3,216,395 | 11/1965 | Girard | 119/252 |
| 3,291,098 | 12/1966 | Halpert | 119/252 |
| 3,584,602 | 6/1971 | Stasio | 119/252 |
| 3,651,785 | 3/1972 | Quinn | 119/248 |
| 3,900,004 | 8/1975 | Goldman et al. | 119/252 |
| 5,144,908 | 9/1992 | Tominaga | 119/248 |

*Primary Examiner*—Todd E. Manahan
*Attorney, Agent, or Firm*—Emmanuel J. Lobato; Burns & Lobato, P.C.

[57] ABSTRACT

A spawning case for use in an aquarium comprises in combination a rectangular case body (A) and filter (B). The case body (A) is arranged within the aquarium so as to communicate with water. The case body A includes a multiplicity of passage slits (11) and a W-shaped partition member (20) having communication paths (24) formed at its valleys. The filter (B) is removably mounted on the external surface of the case body (A). The filter (B) includes on its one side an intake (C) which is brought into intimate contact with the passage slits (11), and at its upper portion a discharge port (33) capable of being selectively directed toward either the interior or the exterior of the case body (A).

5 Claims, 6 Drawing Sheets

SPAWNING CASE FOR USE IN AN AQUARIUM

BACKGROUND OF THE INVENTION

1. Field of the Invention

The present invention relates to a spawning case arrangeable within an aquarium and designed to enclose and spawn parent fish in breeding aquarium fish.

2. Description of the Related Art

A spawning case of this type is typically composed of a rectangular container to be arranged within an aquarium so as to communicate with water therein and is often provided with a unit for circulating water within the spawning case.

SUMMARY OF THE INVENTION

The present invention was conceived to provide an improved spawning case suitable for use in an aquarium. According to an aspect of the present invention, the spawning case comprises in combination a rectangular case body arranged within the aquarium so as to communicate with water therein. The case body has a multiplicity of passage slits formed in its bottom and two opposite sidewalls; and a filter removably mounted on the external surface of one of the opposite two sidewalls of the case body. The filter has on one side an intake which is brought into intimate contact with the passage slits formed in the one of the opposite two sidewalls. The filter has at an upper rotatable portion a discharge port capable of being selectively directed toward either the interior or the exterior of the case body. Preferably, the spawning case body includes a partition member for partitioning the interior of the spawning case body into two layers or spaces, that is, an upper space and a lower space. The partition member has a W-shaped cross section consisting of two V-shaped grooves which extend parallel to each other and taper in cross section toward their bottoms. Each of the bottoms is provided with a slit-like communication path dimensioned to prohibit fully grown fish from passing therethrough.

Thus, according to the spawning case of the present invention, water introduced into the case body passes via the passage slits of the case body to the intake of the filter and then through the filter medium is pumped up from the discharge port, whereupon the water within the case body is filtered to provide a clean spawning environment for parent fish. Also, use of the discharge port capable of being selectively directed toward either the interior or the exterior of the case body will ensure that before spawning the discharge port is directed toward the exterior of the case body to prevent a useless generation of a flow of water to provide a quiet spawning environment for parent fish and that after spawning the discharge port is directed toward the interior of the case body to positively generate the flow of water, thereby forcing fry to swim against the flow of water to accelerate their growth.

BRIEF DESCRIPTION OF THE DRAWINGS

These and other advantages of the present invention will become more apparent from the following detailed description when taken in conjunction with the accompanying drawings, in which.

DESCRIPTION OF THE PREFERRED EMBODIMENTS

An exemplary embodiment of a spawning case according to the present invention will now be described with reference to the accompanying drawings.

Figure 1:
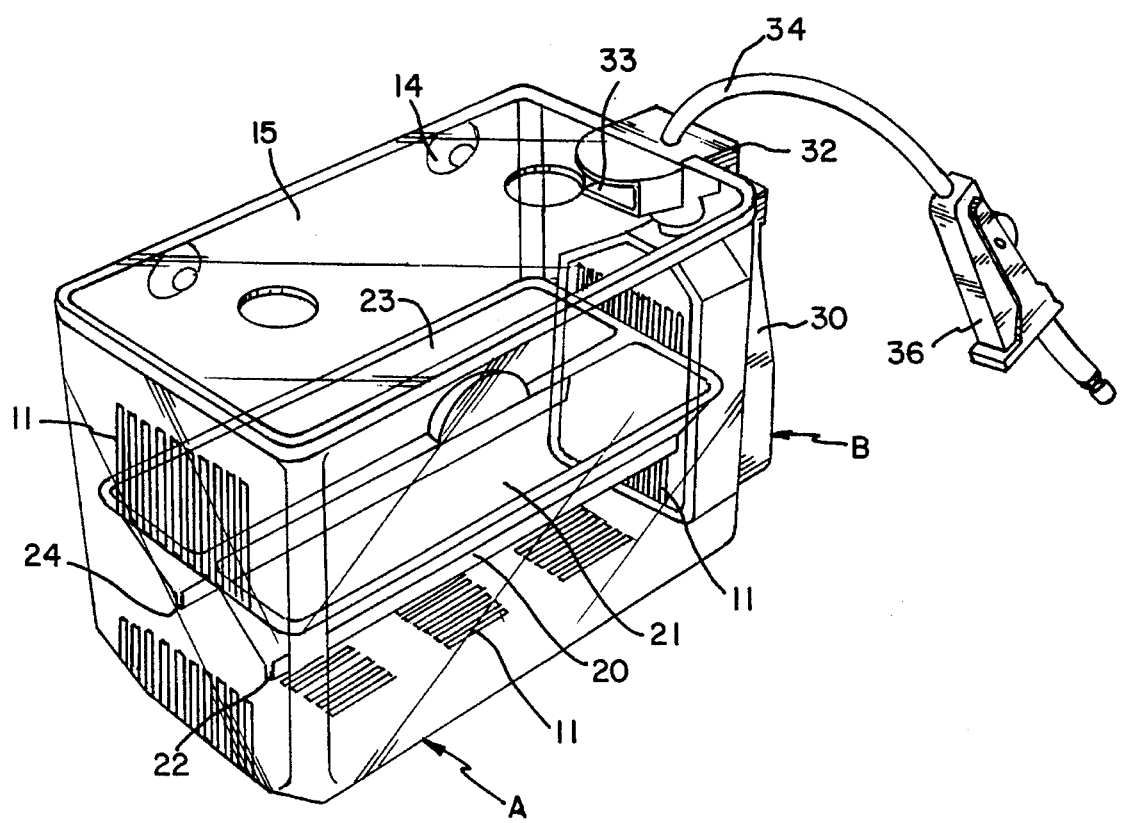
FIG. 1 is a perspective view of a spawning case in accordance with the present invention.

Referring first to FIG. 1 generally depicting the spawning case of the present invention in perspective view, it comprises in combination a rectangular case body A to be arranged within an aquarium (not shown) so as to communication with water therein, and a filter B removably mounted on the external surface of a sidewall of the case body A.

In this embodiment, the case body A is comprised of a bottomed box made of a transparent synthetic resin material. On its bottom and two opposite sidewalls, one of which carries the filter B, the case body A has a multiplicity of communication slits 11 allowing passage of water within the aquarium in which the case body A is disposed. The case body A further includes a plurality of suction cups 14 provided on the external surface of its slitless sidewall for securing the case A to the internal surface of a sidewall of the aquarium, and a cover 15 placed on top of the case A.

Figure 3:
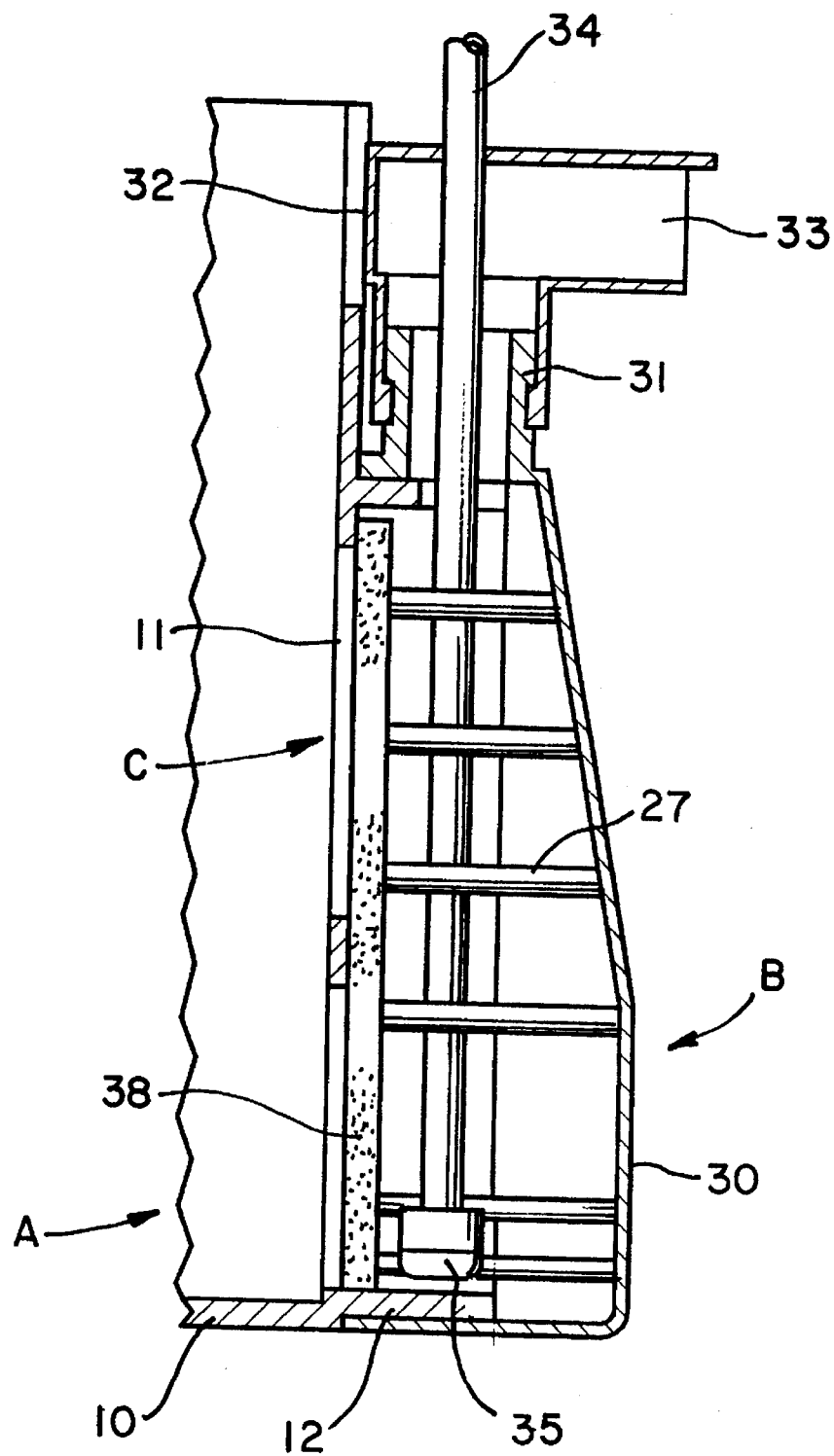
FIG. 3 is a fragmentary sectional view showing part of the spawning case of the present invention.
Figure 4:
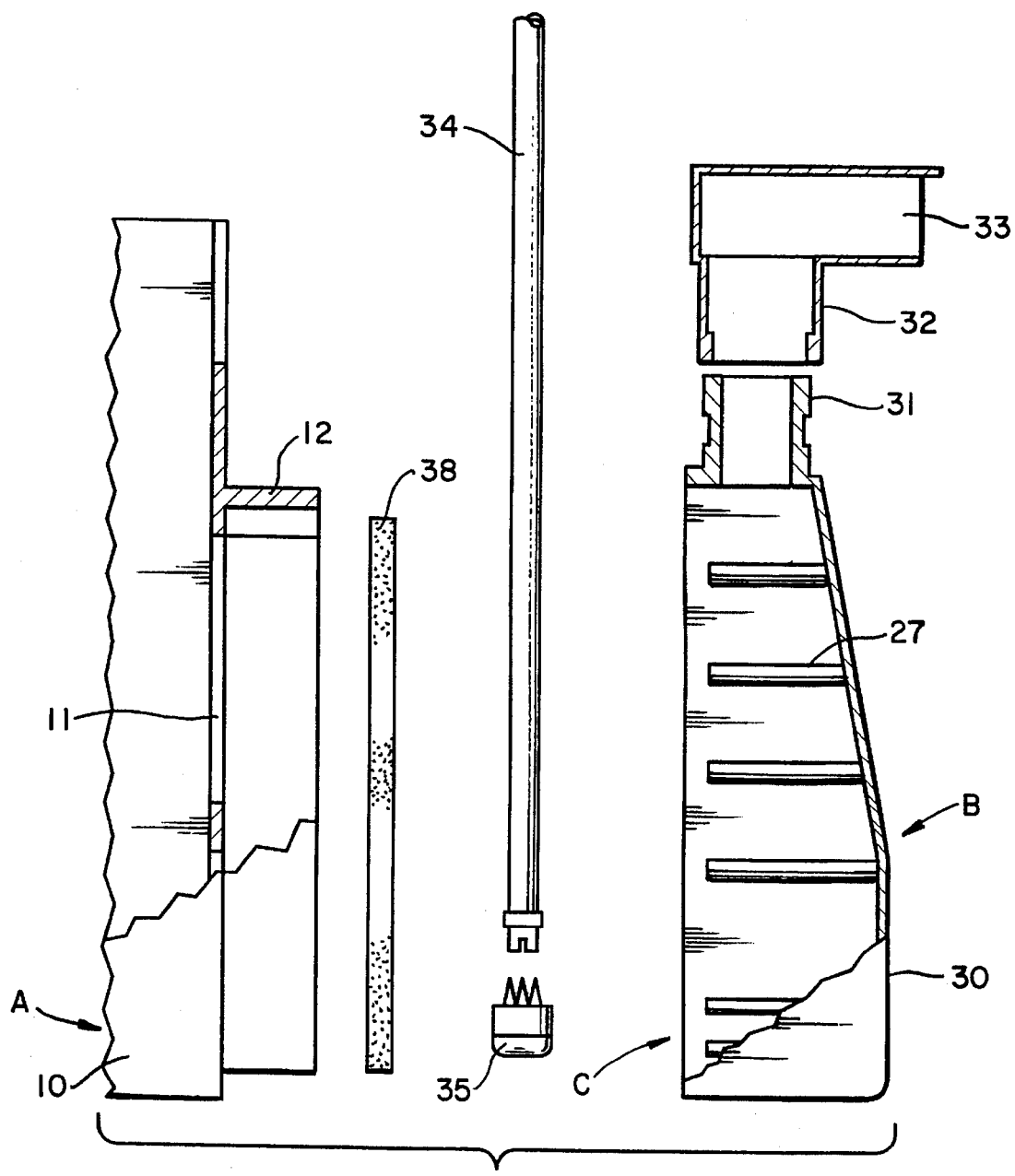
FIG. 4 is an exploded side elevation view showing in a partial cutaway the part of the case body of the present invention shown in FIG. 3.
Figure 5:
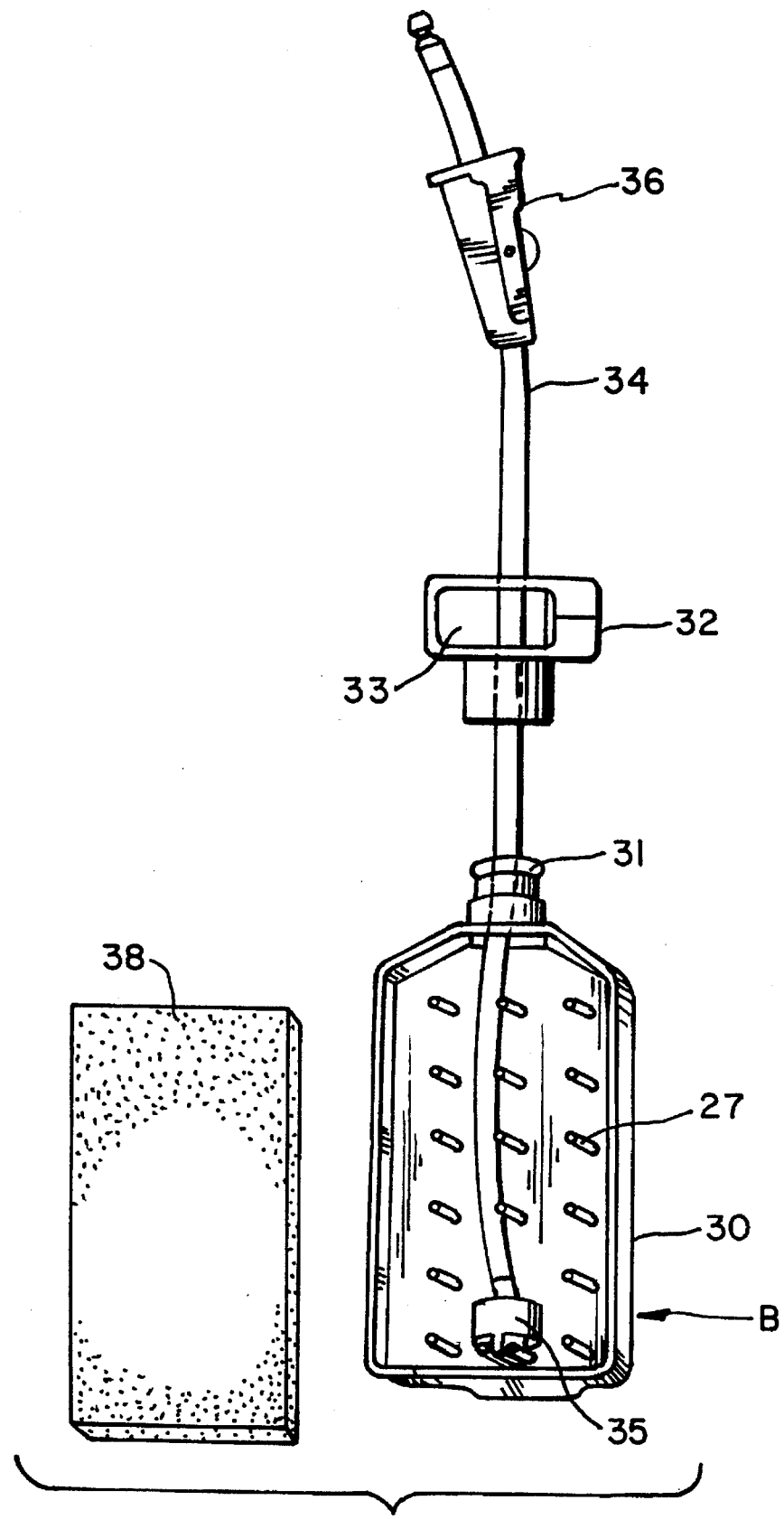
FIG. 5 is an exploded perspective view of a filter for use in the present invention.

As is clear from FIGS. 3 to 5, the filter B has a boxlike pump casing 30 having an open front to define an intake C, an air supply tube 34 extends through the interior of the pump casing 30, and a filter medium 38. The front of the pump casing 30 is externally fitted onto annular ribs 12 provided on a region of the sidewall of the case body A in which the passage slits are formed, and is joined thereto via an appropriate engagement means (not shown) in an intimately contacting manner so as to communicate with the interior of the case body A. It is to be noted in this case that the filter medium 38 is sandwiched between the extremities of a plurality of protrusions 27 extending from the front of the pump casing 30 and the region of the sidewall of the case body A in which the passage slits 11 are formed.

Extending through the interior of the pump casing 30 is disposed an air supply tube 34 coupled to an air pump, not shown; the lower end of the air supply tube 34 is provided with an air diffusing member 35; the upper portion thereof is fitted with a clamp 36 for pressing the tube 34 to regulate the flow of air supplied from the air pump. The upper portion of the pump casing 30 is formed with a neck 31 on which is rotatably mounted a discharge head 32 having on one side a discharge port 33.

In the filter B described hereinabove, pressurized air is fed into the air supply tube 34 to generate bubbles from an air diffusing member 35 located at the lower end, with the result that the specific gravity of the water within the pump casing 30 is reduced to create an upward flow of water, thereby pumping the water within the pump casing 30 through the discharge port 33. In accordance with the above mode of operation, the water within the spawning case A is introduced through the passage slit 11, the filter medium 38 and the intake C into the filter B.

Figure 6:
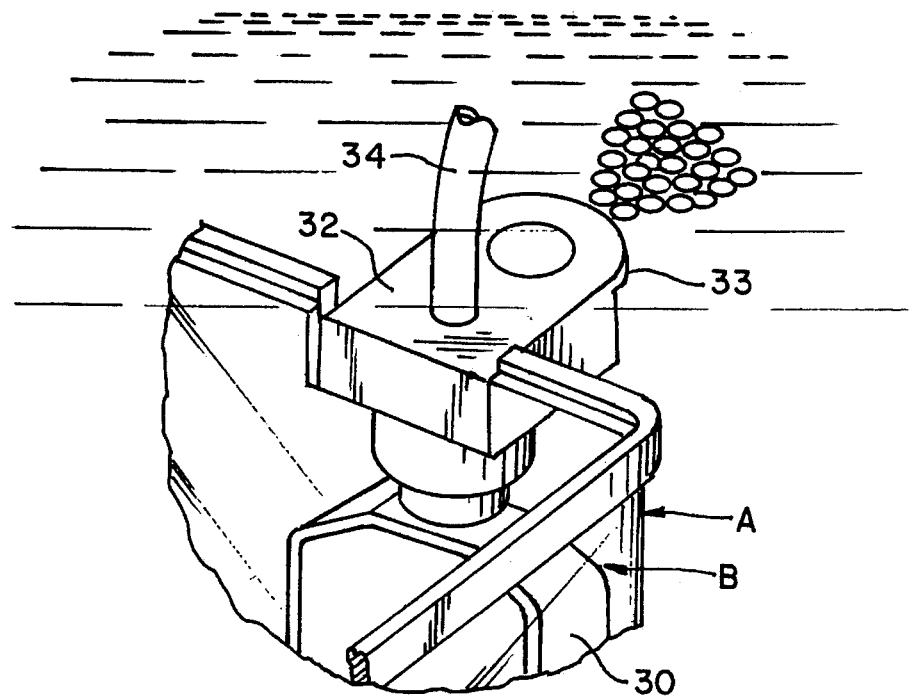
FIG. 6 is a perspective view showing a part of the spawning case of the present invention illustrating its discharge port directed toward the exterior of the case body.
Figure 7:
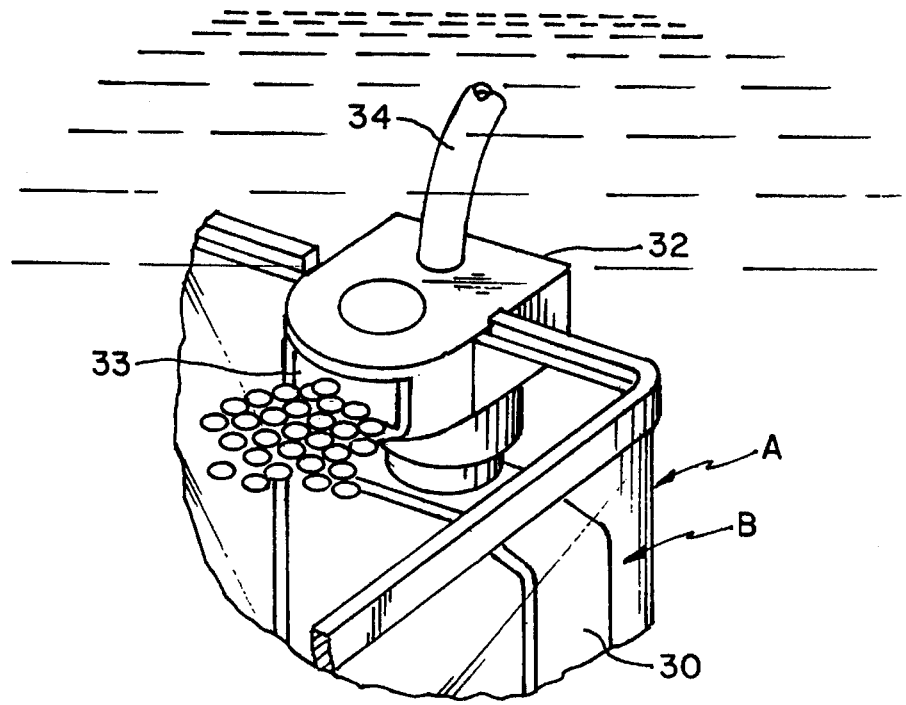
FIG. 7 is a perspective view showing the part of the spawning case of the present invention of FIG. 6 with its discharge port directed toward the interior of the case body.

The discharge head 32 selectively directs its discharge port 33, by selective rotation thereof, toward the interior or the exterior of the case body A. When the discharge port 33 is directed toward the interior of the case body A, the discharge gives rise to a flow of water within the case body A. On the contrary, the discharge port directed toward the exterior will prevent the flow of water from occurring within the case body A (see FIGS. 6 and 7).

Figure 2:
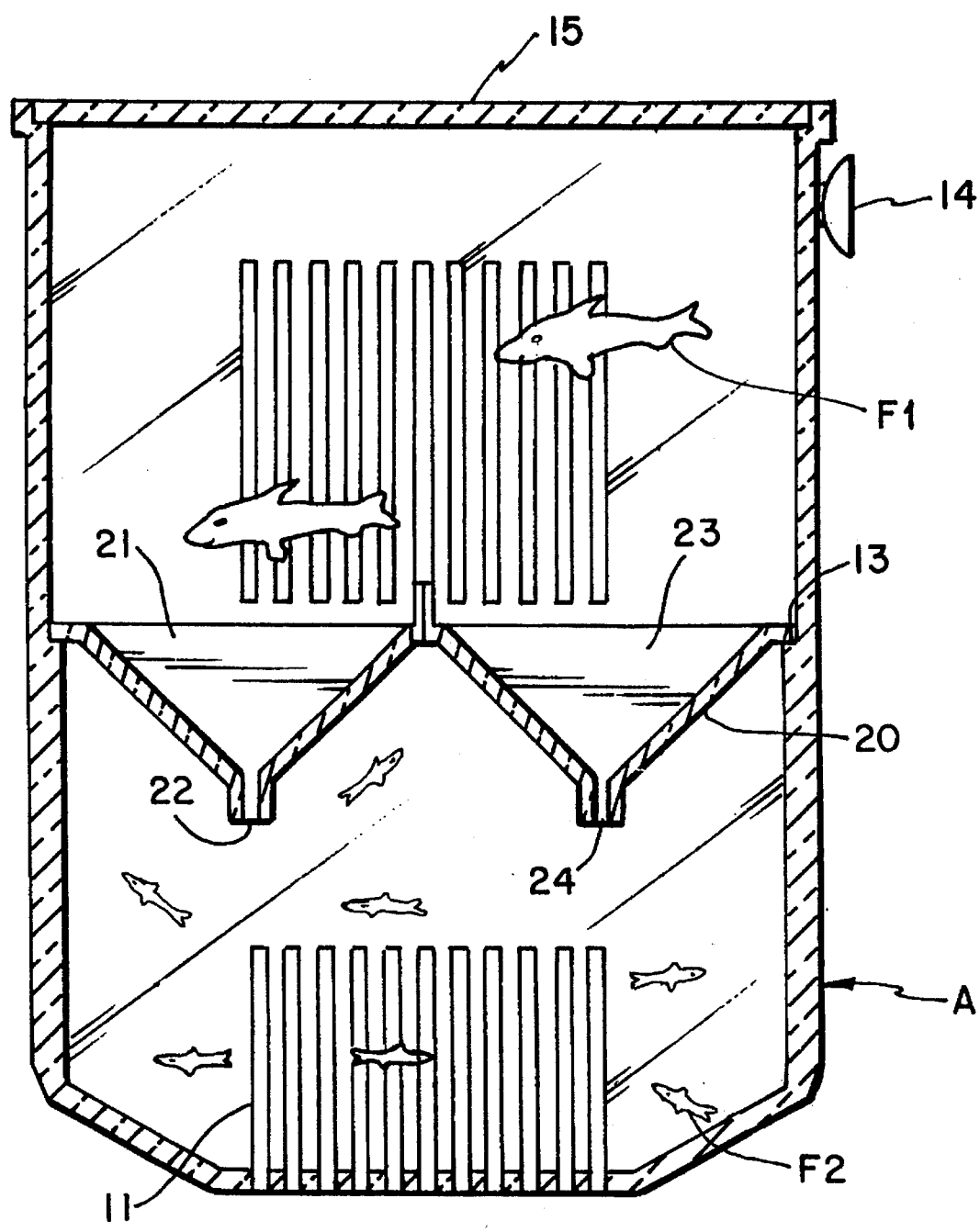
FIG. 2 is a cross sectional view of the spawning case of the present invention.

The case body A of this embodiment further includes a removable partition member 20 disposed on an engagement shoulder 13 horizontally extending along the inner surfaces of the slitless sidewalls of the case body A. The partition member 20 serves to partition the interior of the case body A into layers or spaces, that is, an upper space and a lower space (see FIG. 2). The partition member 20 is made of a transparent synthetic resin material and has a W-shaped section consisting of V-shaped grooves 21 and 23 which extend parallel to each other and taper in cross section toward their bottoms, including slit-like communication paths 22 and 24, respectively, dimensioned to prohibit fully grown fish from passing therethrough.

This configuration will allow spawned eggs to fall into the lower layer or space of the case body A through the communication paths 22 and 24 at the bottoms of the grooves 21 and 23, respectively, of the partition member 20, while prohibiting mature fish such as parent fish from passing through to prevent unexpected predations of fry by their parent fish and other adult fish. (In FIG. 2, reference numeral F1 denotes fully grown fish and F2 denotes fry.)

Thus, the partition member having a W-shaped section consisting of the two parallel extending, V-shaped grooves not only provides ideal grooves with valleys defining substantially acute angles suitable for causing the eggs to fall, but also secures an adequate capacity of the lower layer or space of the case body A without increasing the height of the case body A.

The spawning case of the present invention thus configured will have the following unique effects based on novel concepts:

(1) Water introduced into the case body is passed via the passage slits of the case body to the intake of the filter and then through the filter medium is pumped up from the discharge port, whereupon the water within the case body is filtered to provide a clean spawning environment for parent fish.

(2) Adoption of the discharge port capable of being selectively directed toward either the interior or the exterior of the case body will ensure that before spawning the discharge port is directed toward the exterior of the case body to prevent a useless generation of a flow of water to provide a quiet spawning environment for parent fish and that after spawning the discharge port is directed toward the interior of the case body to positively generate the flow of water, thereby forcing fry to swim against the flow of water to accelerate their growth.

It will be understood by those skilled in the art ttthat a number of variations and modifications may be made in the present invention without departing from its spirit and scope. Accordingly, the foregoing description is to be construed as illustrative only rather than limiting. The present invention is limited only by the scope of the following claims.

What I claim is:

1. In combination, an aquarium and a spawning case, said spawning case comprising:

a rectangular case body having a bottom wall and side walls extending upwardly from said bottom wall;

said bottom wall having a plurality of passage slits and two opposing side walls of the case body having a plurality of passage slits;

a filter removably mounted on an external surface of one of said opposing side walls of said case body;

said filter having an intake on a side thereof in fluid communication with said passage slits in said one of said opposing side walls and a discharge port on an upper portion thereof; and said discharge port including means for selectively directing flow from said filter toward either the interior or the exterior of said case body.

2. A spawning case according to claim 1, in which said case body includes a partition for partitioning the interior of the case body into an upper compartment and a lower compartment;

said partition having a W-shaped cross section defining two V-shaped grooves extending parallel to each other and each tapering in cross section toward a respective bottom; and each groove bottom having a slit-like communication path for communication between the upper compartment and lower compartment and dimensioned to prohibit fully grown fish from passing therethrough.

3. A fish spawning case for disposition in an aquarium comprising:

a rectangular case body for disposition interiorly of an aquarium having water therein;

said case body having a bottom wall and side walls extending upwardly from aid bottom wall;

said bottom wall having a plurality of passage openings and two opposing side walls of said case body having a plurality of passage openings for communicating with the interior thereof;

a filter removably mountable on an external surface of one of said opposing side walls of said case body;

said filter having an intake on a side thereof for fluid communication with said passage openings on said one of said opposing side walls and a discharge port on an upper portion thereof; and said discharge port including means for selectively directing flow from said filter toward either the interior or the exterior of said case body.

4. A fish spawning case for disposition in an aquarium according to claim 3, in which said passage openings on said bottom wall and said passage openings on said one opposing side walls are slits.

5. A fish spawning case for disposition in an aquarium according to claim 3, in which said case body includes a partition for partitioning the interior of the case body into an upper compartment and a lower compartment;

said partition having a W-shaped cross section defining two V-shaped grooves extending parallel to each other and each tapering in cross section toward a respective bottom; and each groove bottom having a slit-like communication path for communication between the upper compartment and lower compartment and dimensioned to prohibit fully grown fish from passing therethrough.

* * * * *